United States Patent Office 3,365,087
Patented Jan. 23, 1968

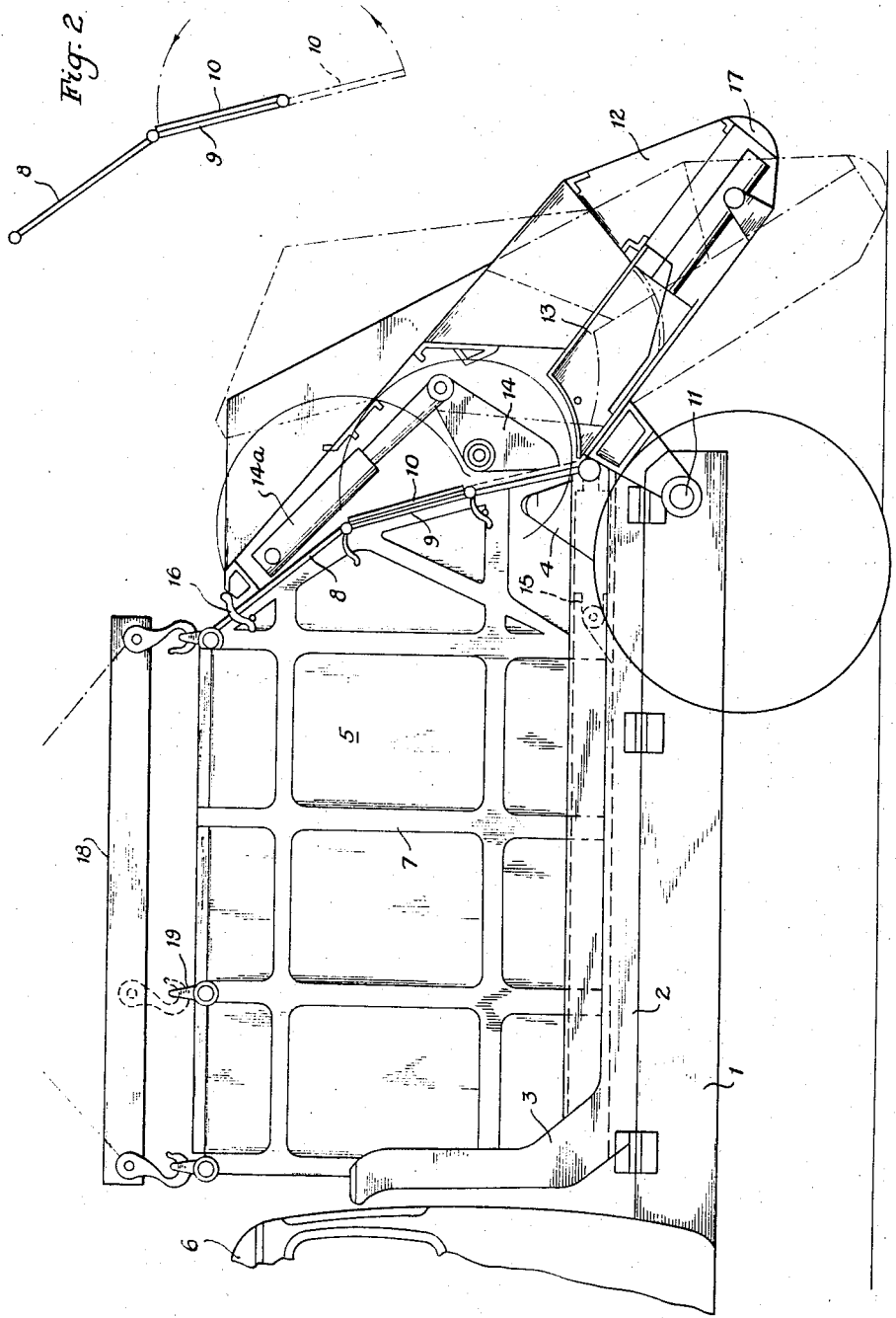

3,365,087
TRASH TRUCK
Max Roedel, Munich, and Carl Kachulle, Neuss-Selikum (Rhine), Germany, assignors to Maschinenfabrik, Augsburg-Nurnberg Aktiengesellschaft, Munich, Germany
Filed Oct. 18, 1965, Ser. No. 497,312
Claims priority, application Germany, Oct. 16, 1964, M 62,782
8 Claims. (Cl. 214—522)

ABSTRACT OF THE DISCLOSURE

A trash truck has a trash tank removably mounted on a chassis. A tail gate carries a thrust member for pushing trash deposited on the tail gate into the tank. The tail gate is pivotally secured to the chassis so that it can be moved rearwardly and downwardly to clear the tank whereby the tank can be lifted from the chassis.

---

This invention relates to a trash truck for collecting trash in which the rear end door opening of the truck body is closable by a member which serves for pushing trash into the truck body and compacting it and is swung out of the way of the opening during the removal of trash from the truck.

In present day trucks, this closure member is held by pivot pins between two strong supports fastened on the sides of the truck body. The driving mechanism for swinging the closure member is a hydraulic cylinder secured to the roof of the truck body which has a piston for actuating the closure member. To remove trash from the truck, the closure member pivots on the supporting pins secured to the side of the truck body and swings upwardly to open the rear end of the truck. Finally, the truck body is tilted around joints between the truck body and the back of the truck chassis so that the trash will slide out of the tank. The closure member and the truck body are therefore always connected to each other.

With the increasing use of centrally located trash incinerators, a problem exists in transporting the trash collected at various extensive distances from the incinerators. Again the incinerators cannot be economically operated unless they are of a certain minimum size and thus one incinerator is too large for a single small community. Consequently, several communities join together to operate a common trash incinerator. The trash collecting trucks must make long trips, especially when they are serving a plurality of small communities and the relatively expensive truck is not used fully for its trash collecting work.

The object of this invention is to produce a trash collecting truck which can be used substantially fully and intensively for its trash collection work.

According to this invention, the rear door closure member for the trash collecting tank, as well as the drive for the closure member, is displaceably mounted on the truck chassis and the trash tank is entirely separable from the truck chassis.

In the collection of trash from various points, the truck of this invention operates as the ordinary trash truck. The trash is dumped on a trash collecting tail gate, is pushed into the tank by a slide member and is compressed within the tank by a pressure plate. A large amount of trash can be received within the tank if the trash is tightly compressed.

When and if the tank is filled with trash, then the truck is driven to a central unloading point for the respective community. There the closure member, instead of being lifted over the tank, is swung rearwardly and downwardly and in final position rests on the road surface. Then the tank is unlocked from the truck chassis. It is then lifted from the vehicle and replaced by an empty tank. This exchange takes only a short time and the truck is ready for collecting more trash. The removed filled tank, together with other filled tanks received at the collecting point, can then be taken to any place for burning or otherwise using or disposing of the trash which may be a far distance away. Depending upon local conditions, the filled tanks can be moved on trailer trucks, railway cars, or even ships or barges. When a sufficiently large number of trash tanks are available, the trash trucks are always ready for use even when transport distances are great. This arrangement is not very costly, even though the trash truck itself is a very specialized and expensive vehicle, nevertheless the trash tank itself is only a very small part of the high cost of the entire vehicle because, according to this invention, it only needs to be a simple metal housing. Thus the advantage is achieved of a full use of the trash truck which grows with the increase of the distance between the trash collecting points and the incinerator, and since the tank structure and the according financial expenditure are low, the trash trucks of this invention are economical even when the trash transport distances are not very great. In this invention, it is therefore not necessary to use different type vehicles within the geographical range of several communities having various distances to the joint incinerator. The initial cost for the trash truck is basically not more than with the conventional trash trucks and any additional cost lies only in the additional tanks. Even the trash truck itself can be constructed at a lower cost than heretofore possible because of mechanism for tilting the tank on the truck chassis is eliminated for each truck. Such tilting mechanism as heretofore used is expensive because it must tilt the weight of a full truck body or tank plus its own weight. In this invention, the empty tanks being returned from an incinerator can be used as containers for transporting any suitable goods or material. For example, the ashes of the burned trash, or compost which has been sifted from the trash before it is burned can be returned to the respective community. It is therefore seen that this invention makes possible a more substantial and expedient supply, at low cost, the equivalent of a greater number of more costly trash trucks.

The truck of this invention has the advantage that the closure member or tail gate can be swung rearwardly and downwardly and then the tank can be vertically lifted from the truck chassis. Any type of crane can be used for the purpose of exchanging the tanks and the crane needs only to be provided with a suitable lifting beam.

In order to place an empty tank accurately and quickly on the chassis by using unskilled labor, a plurality of guide posts are provided on the chassis which have inclined lower portions extended into vertical portions and with the tank given a complementary shaped bottom. Thus when an empty tank is lowered into position, it is automatically guided into correct position with respect to the chassis frame.

There is no danger that the trash can fall out of the tank when it is lifted if the trash is tightly compressed therein even though the rear door opening is not closed. The trash will slide out only when the tank is tilted rearwardly. However, in this invention, the door opening is closable by a plurality of door plates hinged to the tank and to each other in order to close the door opening and to prevent loose trash from spilling out of the tank, especially when the tank is rocking or swaying while being lifted from the chassis.

The use of such door plates does not provide any additional cost because the conventional tanks are also provided with a cover plate for the rear opening of the truck body so that the trash can be compressed without being moved rearwardly. In this invention, the door plates are mounted on the tank and made correspondingly larger than the usual closure plates. The tail gate thus does not include a closure plate and is constructed as an open top member which is just large enough so that the trash dumped therein can be pushed into the tank without spilling.

In order to hold the tail gate in position when it is moved outwardly and downwardly, it is mounted on the chassis so that its end will rest on the road surface and form a support for partially supporting the chassis and relieving the load on the operating mechanisms.

A pair of hydraulic pistons are used as the driving means for the tail gate, one of which is mounted on opposite sides of the chassis.

The posts for guiding the tank while being lifted from or lowered on the chassis includes a pair of posts adjacent the driver's cab which extend upwardly to such an extent that the rear wall of the cab is protected against being struck by a tank being lifted from or lowered on the chassis.

In order to lift the tank, eyes are secured to the top portion of the tank for being engaged by the lifting hooks of a crane. These hooks, in pairs, are positioned at varying distances from the center of the tank top portion.

Preferably the tank is constructed of metal and is reinforced by an external frame to which the lifting eyes are fastened.

The means by which the objects of the invention are obtained are described more fully with reference to the accompanying drawings in which:

FIGURE 1 is a side view of a trash truck according to this invention; and

FIGURE 2 is an enlarged detail view of a portion of FIGURE 1.

On the truck chassis 1 is mounted an auxiliary frame 2 which has guide posts 3 and 4 having inwardly inclined lower portions extended into vertical portions for the purpose of guiding the positioning of tank 5 which has a complementary shaped bottom. The front guide post 3 is extended upwardly far enough to protect the rear wall of the driver's cab 6 and for this purpose is of heavy construction so as to withstand being struck by the tank 5 when it is swinging back and forth when lifted from or lowered onto the frame. Tank 5 is composed of metal and is reinforced by an exterior frame 7 which is secured to the tank. The tank is closed on all sides except a rear door opening which is partially closed by an upper door plate 8 hinged to the tank 5 and to which is hinged a center door plate 9 which, in turn, is hinged to a lower movable door plate 10. Pivot pins 11 secured to chassis 1 hold the tail gate 12. A hydraulically operated trash thrust member 13 is mounted on the tail gate. Also, the tail gate carries a trash compressing plate 14 and its hydraulic piston drive 14a. The tail gate is movable by hydraulic pistons, one on each side of the chassis, which extend from the chassis 1 to the tail gate 12.

As shown by the solid lines in FIGURE 1, when the truck is ready to receive trash, the tail gate 12 is swung upwardly over the rear door opening of the tank 5 and held in place by some conventional locking means 16. The tail gate 12 then communicates through open door plate 10 into the interior of the tank 5. Any trash which has been dumped into the tail gate is pushed by the thrust member 13 to within the range of the pressure plate member 14 at the entrance to the rear door opening into tank 5. The pressure plate is then activated to force the trash into tank 5 and compress it therein.

When the partially filled or completely filled with trash tank is to be removed from the truck, the locking means 16 are released and the tail gate lowered as shown by the dash-dot lines until its outer end 17 rests on the road surface. The hydraulic pistons 15 prevent the end 17 from hitting the road surface hard when the center of gravity is accordingly shifted. In this position, the tail gate supports the weight of the thrust member 13 and pressure plate 14 and thus partially relieves the load on the chassis 1. The rear door opening of the tank can then be completely closed by the lower door plate 10 which has previously been resting on the center door plate 9. Then, if desired, door plate 10 can be locked to the tank, it being assumed that door plates 8 and 9 have been already locked to the tank. Tank 5 is then ready to be lifted from the chassis. For this purpose, the lifting beam 18 of a crane is provided with hooks which are engaged with the lifting eyes 19 secured to the upper portion of the reinforcing frame 7. While being lifted, the tank 5 positions itself in at least an approximately horizontal plane because of the pivotal support of the hooks and the eyes 19 and therefore can be withdrawn from the guide posts 3 and 4. When the tank is to be emptied, a corresponding beam 18 is hooked to the tank in such a manner that the tank is inclined rearwardly. Then when the door plates 8, 9 and 10 are opened, the trash can slide rearwardly out of the tank. If the tank is lifted so that its front side is slightly tilted downwardly then it is not necessary to lock door plates 9 and 10. In order to adjust the angle of tilt of the tank, a plurality of pairs of eyes are provided along the top portion of the tank at various distances from the center of the top portion.

When an empty tank is lowered onto the chassis, it is guided by posts 3 and 4 into proper position with respect to chassis 1 and thereby held in position. Tail gate 12 is then swung upwardly and locked by locking means 13 so that the tank is ready to receive trash.

Having now described the means by which the objects of the invention are obtained, we claim:

1. A trash collecting truck comprising a chassis, a driver's cab on said chassis, a trash tank removably carried on said chassis, a door opening in the rear end of said tank, a tail gate pivotally secured to the rear end of said chassis for rearward and downward movement away from said tank to provide clearance, drive means secured to said chassis and said tail gate for pivotally moving said gate, and trash thrust means carried by said tail gate for moving trash deposited on said tail gate into said tank, whereby only the tank is liftable upwardly from said chassis for dumping the trash collected in said tank.

2. A truck as in claim 1, further comprising guide posts having inclined lower portions extended into vertical portions mounted on said chassis for guiding a tank being lowered into position on said chassis, and said tank having a bottom complementary in shape to said inclined portions of said guide posts.

3. A truck as in claim 2, further comprising a plurality of door plates hinged to each other and to said tank for closing said door openings.

4. A truck as in claim 3, said tail gate being movable into contact with a road surface for partially supporting said chassis and relieving the load on said drive means.

5. A truck as in claim 4, said driving means comprising a hydraulic piston drive on each side of said chassis, respectively.

6. A truck as in claim 5, said guide posts including a pair of posts adjacent said driver's cab and their vertical portions extending a substantial distance adjacent said cab for protecting said cab against being struck by the swinging of said tank during the lifting and lowering thereof.

7. A truck as in claim 6, further comprising a plurality of lifting hoist eyes attached to the upper portion of said tank and spaced at various distances from the center of said upper side portion for receiving the hooks of a lifting beam.

8. A truck as in claim 7, further comprising a tank composed of metal, an outer reinforcing frame secured to said tank, and said eyes being fastened to said frame.

References Cited
UNITED STATES PATENTS

| | | | |
|---|---|---|---|
| 2,062,924 | 12/1936 | Ochsner | 214—503 |
| 3,230,868 | 1/1966 | Smith | 214—83.3 |

GERALD M. FORLENZA, *Primary Examiner.*

ALBERT J. MAKAY, *Examiner.*